US008111388B2

(12) United States Patent
Glandt et al.

(10) Patent No.: US 8,111,388 B2
(45) Date of Patent: Feb. 7, 2012

(54) LUMINOUS FLUX DEPRECIATION NOTIFICATION SYSTEM FOR LIGHT FIXTURES INCORPORATING LIGHT EMITTING DIODE SOURCES

(75) Inventors: Christopher M. Glandt, Milwaukee, WI (US); Jay M. Eissner, Sheboygal, WI (US); Mark J. Hastings, New Berlin, WI (US)

(73) Assignee: Oldenburg Group Incorporated, Glendale, WI (US)

( * ) Notice: Subject to any disclaimer, the term of this patent is extended or adjusted under 35 U.S.C. 154(b) by 7 days.

(21) Appl. No.: 12/850,068

(22) Filed: Aug. 4, 2010

(65) Prior Publication Data

US 2011/0299068 A1 Dec. 8, 2011

(51) Int. Cl.
*G01J 1/42* (2006.01)
*F21V 23/04* (2006.01)
*H05B 37/02* (2006.01)

(52) U.S. Cl. ......... 356/218; 356/213; 362/231; 315/291

(58) Field of Classification Search .......... 356/213–218; 362/84, 231, 291–294, 276, 545, 296.01; 315/82, 291, 312
See application file for complete search history.

(56) References Cited

U.S. PATENT DOCUMENTS

| | | | |
|---|---|---|---|
| 4,079,250 A | 3/1978 | Jeffcoat | |
| 4,433,238 A | 2/1984 | Adolfsson et al. | |
| 6,097,302 A | 8/2000 | Zinzell | |
| 6,348,766 B1 | 2/2002 | Ohishi | |
| 6,376,992 B1 * | 4/2002 | Petrick | 315/82 |
| 6,964,507 B2 * | 11/2005 | Mohacsi | 362/545 |
| 7,138,970 B2 | 11/2006 | Krohn | |
| 7,391,335 B2 | 6/2008 | Mubaslat et al. | |
| 7,476,002 B2 * | 1/2009 | Wolf et al. | 362/231 |
| 7,489,089 B2 * | 2/2009 | Gandhi | 315/291 |
| 7,652,480 B2 | 1/2010 | Mollet | |
| 7,722,220 B2 * | 5/2010 | Van De Ven | 362/294 |
| 7,901,107 B2 * | 3/2011 | Van De Ven et al. | 362/231 |
| 7,997,745 B2 * | 8/2011 | Van De Ven et al. | 362/84 |
| 2003/0189412 A1 * | 10/2003 | Cunningham | 315/312 |
| 2004/0105264 A1 * | 6/2004 | Spero | 362/276 |
| 2010/0118543 A1 * | 5/2010 | Hong | 362/296.01 |

FOREIGN PATENT DOCUMENTS

| | | |
|---|---|---|
| JP | 61155776 A | 7/1986 |
| JP | 08201472 A | 8/1996 |
| JP | 2000172986 A | 6/2000 |
| JP | 2009081005 A | 4/2009 |

* cited by examiner

*Primary Examiner* — Sang Nguyen
(74) *Attorney, Agent, or Firm* — Reinhart Boerner Van Deuren s.c.

(57) ABSTRACT

A LED light fixture and a luminous flux monitoring system for a light fixture. The light fixture includes a housing defining an interior space including an interior surface and a transmissive panel. A light source is coupled to the interior surface. The system includes a light sensor coupled to the interior surface and aligned to receive light from the transmissive panel, light source, and/or interior surface. The light sensor is configured to measure luminous flux in the interior space. A controller is coupled to the light source and the light sensor. The controller is configured to determine if a light sensor measurement of luminous flux in the interior space is more or less than a reference value of the luminous flux. If the measurement of luminous flux is less than the reference value, the controller is configured to activate an end-of-life indicator. The reference value equals (total flux−internal ambient flux)× depreciation factor.

17 Claims, 10 Drawing Sheets

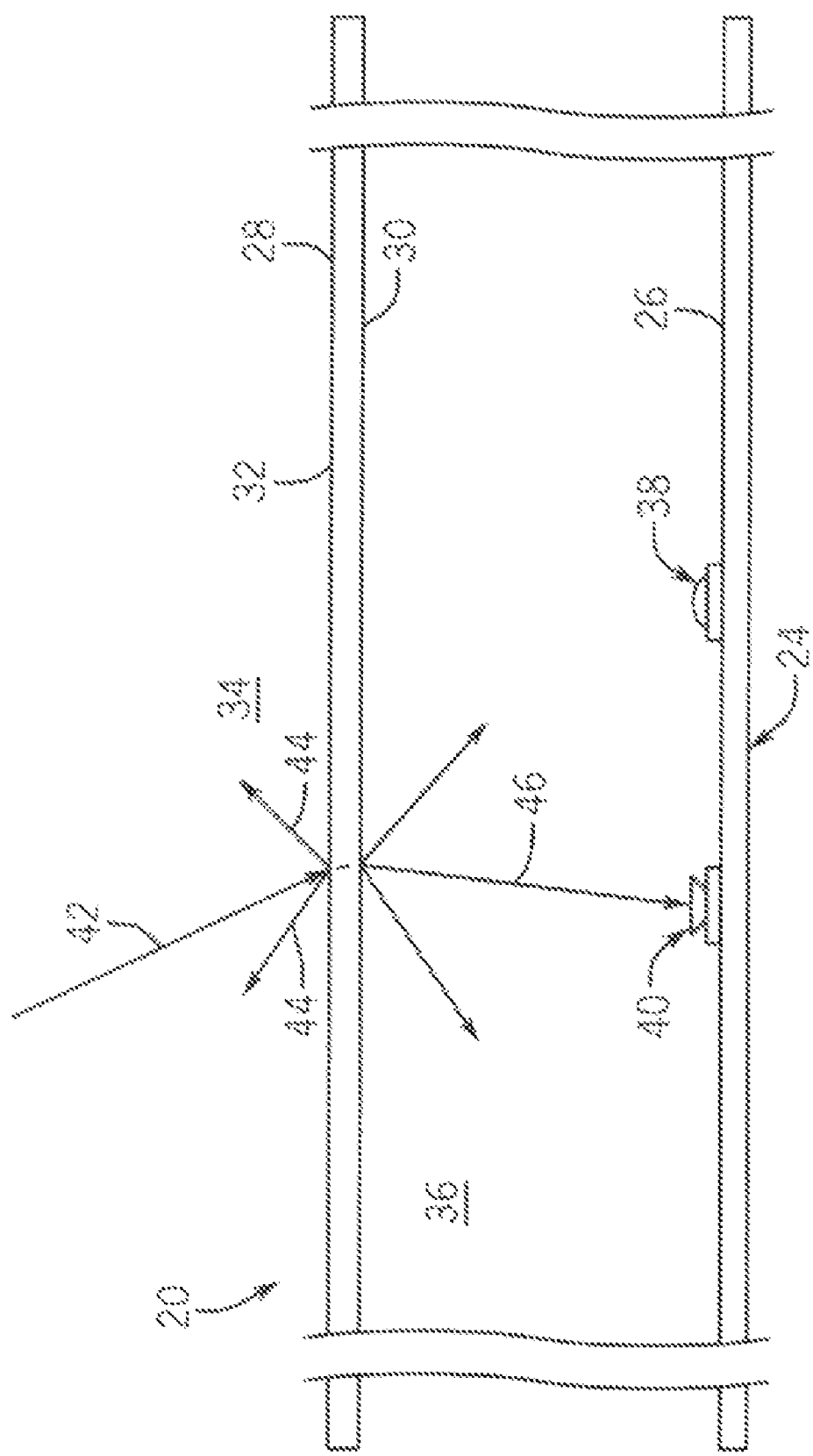

LUMINOUS FLUX DEPRECIATION NOTIFICATION SYSTEM FOR LIGHT FIXTURES INCORPORATING LIGHT EMITTING DIODE SOURCES

BACKGROUND

Field of the Invention

The present invention relates generally to light fixtures and more particularly to a monitor of the luminous flux of the light fixture.

Lighting fixtures using light emitting diodes as a light source offer many potential benefits, including energy savings, reduction of hazardous substance waste, and greater convenience through reduced maintenance and replacement due to the greatly extended life compared to lighting fixtures using traditional light sources.

Light emitting diodes (or LEDs) do not fail in the same manner as other common sources of light. Incandescent, fluorescent, and high-intensity discharge sources are generally assumed to be at the end of their lives when they "go out," or fail. Unlike these sources, the output of an LED slowly declines over time, such that very little light is emitted from the LED by the time it reaches its thermal or mechanical limits. Provided the mechanical, thermal, and electrical support systems are managed properly, an LED may operate for hundreds of thousands of hours before ceasing to emit perceptible light. Based on this fact, the lighting industry has agreed that when used as a light source, an LED has reached the end of its useful life when its output has decreased 30% from its initial output. This is commonly referred to as "$L_{70}$" life, so named as the LED light source is producing 70% of its initial output.

This does, however, create a problem for users of LED light fixtures. Accepted practice is to design the lighting for the majority of spaces based on the minimum amount of light (luminous flux) that a light source will emit during its useful life. By doing so, the user of the space has reasonable certainty that the amount of light in the space will not drop below what is required for the task, provided the space and light fixtures are properly maintained. Since all light sources' output decreases over time, proper maintenance often includes replacement of sources that have reduced in lumen output below a specified threshold (such as $L_{70}$). Unfortunately, such maintenance relies on diligent adherence to a maintenance schedule. Such maintenance plans are frequently disregarded, and therefore sources are often replaced only when they completely cease operation, rather than on a periodic basis to preserve the quality of lighting within a space.

This creates a problem for lighting fixtures using LED light sources, which do not have a normal complete failure mode (provided that the LED light sources are operated within manufacturer's guidelines). If the user of a space does not follow the recommended schedule for replacement of the LED light sources (replacement after a certain period of time equivalent to $L_{70}$ life), the sources may fade to a point that the lighting is inappropriate long before the LED light sources fail completely and are changed. Such a situation can cause, among other outcomes, reduced productivity, occupant discomfort, injury, and even death (in certain circumstances) when the lighting becomes too dim for its intended use.

[Though the practice of using a light-sensitive element (light sensor) to detect the amount of light emitted from a lighting system is not a new concept, the form factor and manufacturing means required for the construction of an LED lighting fixture creates difficulty in placement of the light sensitive element. Further difficulty is introduced by the fact that most light fixtures operate in a space where there are other light-emitting elements, thus possibly contributing to the amount of light measured by an internal light sensor and introducing error into any intended measurement of the luminous flux produced by a light fixture.

The apparatus of the present disclosure must also be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present disclosure.

The disclosure describes a system for measurement of the luminous flux emitted by an LED light source (one or more light emitting diodes) within an electric light fixture, a system for comparing the measured luminous flux to a reference value and notification when the measured luminous flux falls below the reference value, and a system to allow setting and re-setting of the reference value. The disclosure includes the arrangement of a detector element relative to the location of the LEDs and use of the internal reflective and transmissive elements comprising the structure of a lighting fixture to produce comparative measurements of the total luminous flux generated by the plurality of LEDs, and a system to account for ambient light that may be present in the same space as the light fixture.

There is provided a luminous flux monitoring system for a light fixture. The light fixture is coupled to an electric power source and includes a housing defining an interior space including an interior surface and a transmissive panel disposed a spaced-distance from the interior surface. The housing includes a light source coupled to the interior surface. The system includes a light sensor coupled to the interior surface a spaced-distance from the light source and aligned to receive light from at least the transmissive panel. The light sensor is configured to measure luminous flux in the interior space. A controller is coupled to the electric power source, the light source, and the light sensor. The controller is configured to determine if a light sensor measurement of luminous flux in the interior space is more or less than a reference value of the luminous flux. If the measurement of luminous flux is less than the reference value, the controller is configured to activate an end-of-life indicator. In another embodiment, the reference value of luminous flux is a value derived by multiplying the difference between a total luminous flux measurement in the interior space from ambient light and the light from the light source and an ambient luminous flux measurement in the interior space with the light source off by a depreciation factor. The depreciation factor is a real number from zero to 1.

There is also provided a method for monitoring luminous flux depreciation in a light fixture. The light fixture is coupled to an electric power source and includes a housing defining an interior space including an interior surface and a transmissive panel disposed a spaced-distance from the interior surface. The housing includes a light source, coupled to the interior surface. The method includes the steps of coupling a light source to the interior surface a spaced-distance from the light source and aligning the light sensor to receive light from at least the transmissive panel, with the light sensor configured to measure luminous flux in the interior space. A controller is coupled to the electric power source, the light source, and the light sensor. The controller is configured to determine if a light sensor measurement of luminous flux in the interior space is more or less than a reference value of luminous flux. If the measurement of luminous flux is less than the reference value, the controller is configured to activate an end-of-life indicator. The method may include the steps of determining the reference value of luminous flux by subtracting an ambient luminous flux measurement taken in the interior space with the light source off from a total luminous flux measurement in the interior space of ambient light and the light from the light source, and multiplying the difference by a depreciation factor. The depreciation factor may be a real number from zero to 1.

There is further provided a LED light fixture coupled to an electric power source. The LED light fixture includes a housing defining an interior space including an interior surface and a transmissive panel disposed a spaced-distance from the interior surface. An LED light source is coupled to the interior surface. A light sensor is coupled to the interior surface a spaced-distance from the LED light source and aligned to receive light from at least the transmissive panel. The light sensor is further configured to measure the luminous flux in the interior space. The controller is coupled to the electric power source, the LED light source, and the light sensor. The controller is configured to determine if a light sensor measurement of luminous flux in the interior space is more or less than a reference value of luminous flux. If the measurement of luminous flux is less than the reference value, the controller is configured to activate an end-of-life indicator. The measurement of luminous flux include luminous flux from the LED light source reflected from the transmissive panel, luminous flux directly from the light source, luminous flux reflected from the interior surface, and ambient luminous flux passing through the transmissive panel or without passing through the transmissive panel. The reference value of luminous flux is a value derived by multiplying the difference between a total luminous flux measurement in the interior space from ambient light and light from the LED light source and an ambient luminous flux measurement in the interior space with the LED light source off, by a depreciation factor. The depreciation factor is a predetermined real number from zero to 1.

The apparatus of the present disclosure is of a construction which is both durable and long lasting, and which will require little or no maintenance to be provided by the user throughout its operating lifetime. The apparatus of the present disclosure is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWING

These and other advantages of the present disclosure are best understood with reference to the drawings, in which:

FIG. 4 is a schematic illustration of a physical arrangement of the light production, transmission, reflection, and detection elements of the light fixture illustrated in FIG. 2 and the interaction of the elements when in an environment such that one or more sources of light external to and not part of the light fixture are present, and the light emitting portions of the LED light source of the light fixture are not energized.

DETAILED DESCRIPTION OF THE EXEMPLARY EMBODIMENTS

The disclosure includes two main parts. The first part is a light fixture 20 including an arrangement of components within an LED lighting fixture 20, heretofore identified as the optical arrangement. The second part is a luminous flux monitoring system 18 including a control and measurement system and control process integral to the control system that oversees its function. The embodiments described comprise preferred embodiments, but do not exclude other possible arrangements or systems achieving the same result through similar means that may be inferred from this disclosure.

For purposes of this disclosure, "light" is defined as that part of the electromagnetic spectrum having a wavelength or plurality of wavelengths between 360 nanometers and 800 nanometers, inclusive. Luminous flux (measured in lumens) is the sum of the radiant power (in Watts) of all wavelengths of light within a defined space, scaled to a standardized human visual response.

When light strikes any surface, a portion is transmitted through the surface, a portion is absorbed by the surface and a portion is reflected by the surface. It is assumed that the time period over which any comparative measurements are taken by the invention is of a duration short enough such that any source of light internal or external to the system is of a consistent intensity and direction (or a collection of these) once entering the fixture.

For purposes of this disclosure, an LED is a single light emitting diode package. An LED light source is an arrangement of one or more LEDs. For example, the LEDs may be arranged in a circle and mounted in an enclosure with a bezel, or the LEDs may be mounted on a circuit board and arranged linearly or in a matrix pattern as determined by a user or manufacturer. An LED lighting fixture is a lighting fixture that distributes light generated by a LED light source.

Figure 1B:
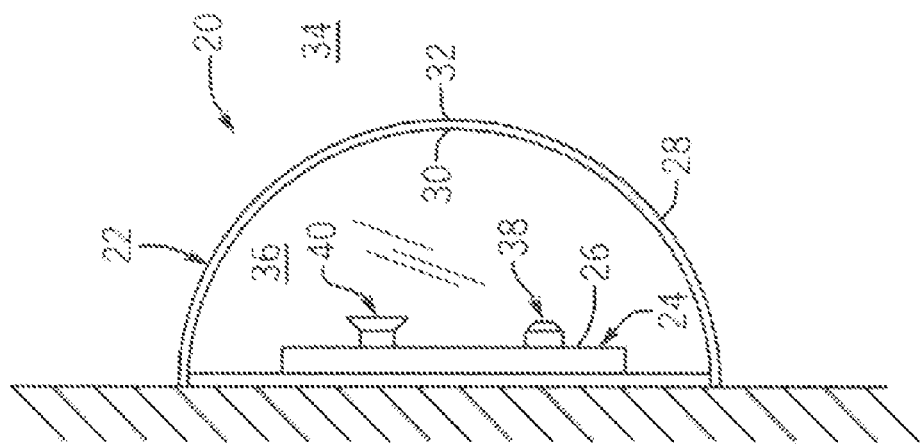
FIG. 1B illustrates an exemplary embodiment of a fixture whose housing partially encloses a LED light source.
Figure 1A:
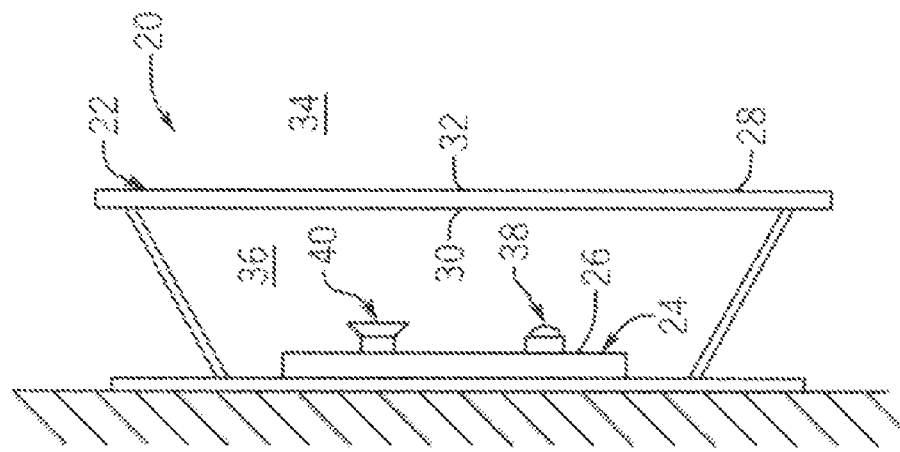
FIG. 1A illustrates an exemplary embodiment of a fixture whose housing (including any light-transmitting surfaces) completely encloses a LED light source.
Figure 2:
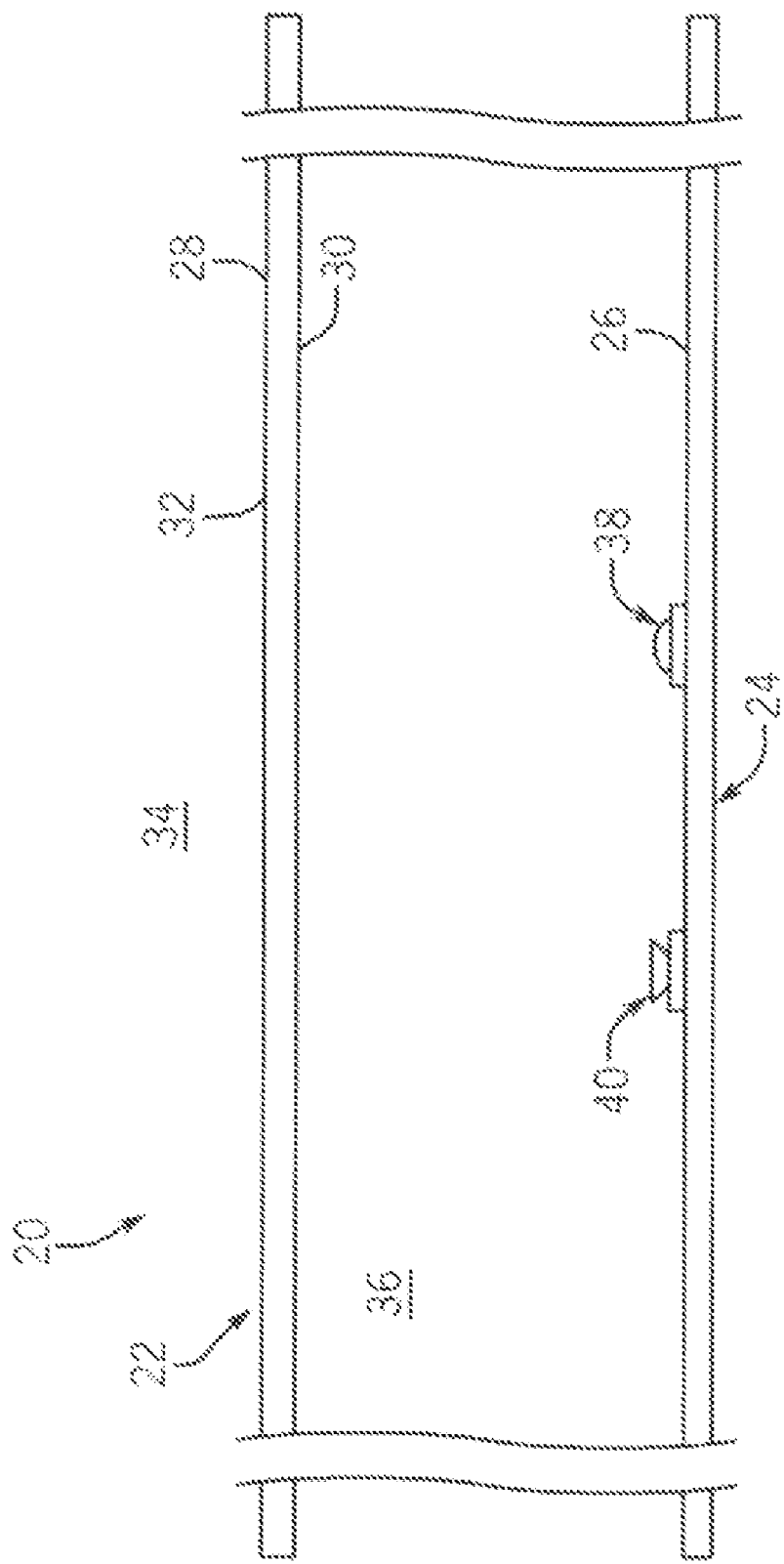
FIG. 2 is a schematic arrangement of the light production, transmission, reflection, and detection elements of an exemplary embodiment of a LED light fixture.

FIG. 2 shows a generalized embodiment of a light fixture 20 including a LED light source 38, transmissive panel 28, a support panel 24, and a light sensor 40 which comprise the optical arrangement of the light fixture 20. An LED light source 38 is affixed to an interior surface 26 of the support panel 24 of the housing 22 of an LED lighting fixture 20. Between the LED light source 38 and the exterior 34 of the housing 22 of LED lighting fixture 20, the transmissive panel 28 having a transmissive surface 30 is positioned with the surface 30 having an optical transmission greater than 0% and less than 100%. Surface 30 may or may not totally correspond with surface 26. Also affixed to the interior surface 26 of the LED light fixture 20 is a light sensor 40, which may be of any type. The light sensor 40 is configured to generate a signal representative of the luminous flux present within the interior 36 of the light fixture 20. In one embodiment the light sensor includes an apparatus to correct the sensitivity spectrum to one approximating the response of the human eye. The light sensor 40 may have any acceptance or viewing angle α.

Figure 3A:
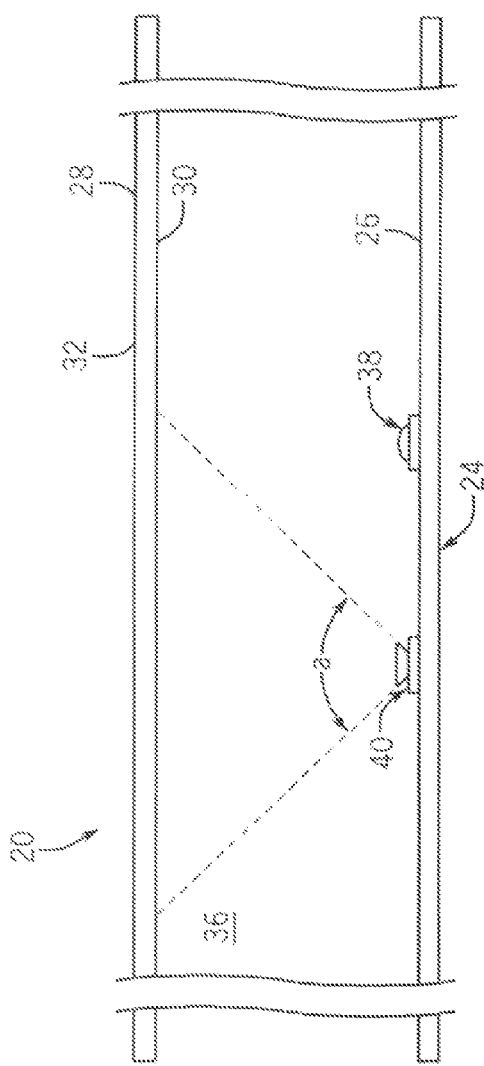
FIG. 3A is a schematic illustration of a physical arrangement of a permitted relative spatial locations of the elements of FIG. 1 with respect to the viewing angle α of light detection elements of a light sensor in a light fixture.
Figure 3B:
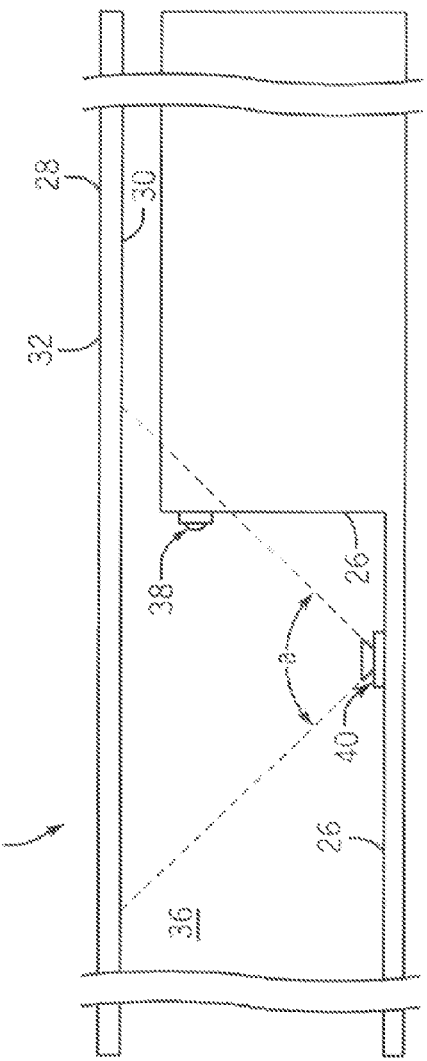
FIG. 3B is a schematic illustration of a physical arrangement of a permitted relative spatial locations of the elements of FIG. 1 with respect to the viewing angle α of light detection elements of a light sensor in a light fixture.

The arrangement of the elements shown in FIG. 2 is such that the transmissive surface 30 may or may not entirely fill the field of view (defined by the angle α and extending to the transmissive surface 30 of the transmissive panel 28) of the light sensor 40, and other elements may be positioned within this field. FIGS. 3A and 3B shows two examples to demonstrate these conditions: 1) a first configuration where no objects are positioned within the viewing angle α of the light sensor 40 and a portion of the transmissive surface 30, and 2) a second configuration where LED light source 38 and part of interior surface are positioned within the viewing angle α of the light sensor 40.

The interior 36 of the housing 22 defines a volume enclosed by the LED lighting fixture 20 surface and the transmissive surface 30 which acts as a bulk integrator of any light entering the fixture from an external source or light generated from an internal source. Therefore, the quantity of light striking the photoreceptive surface of light sensor 40 is proportional to the sum total of the luminous flux entering the fixture from any external source and the luminous flux from any internal source. Since an objective of the disclosure is the determination of the relationship between two quantities of luminous flux (an initial amount and the amount generated at some later time), rather than the exact quantities themselves, absolute measurement of the quantity of luminous flux emitted by any LED lighting system is not a requirement.

Figure 5:
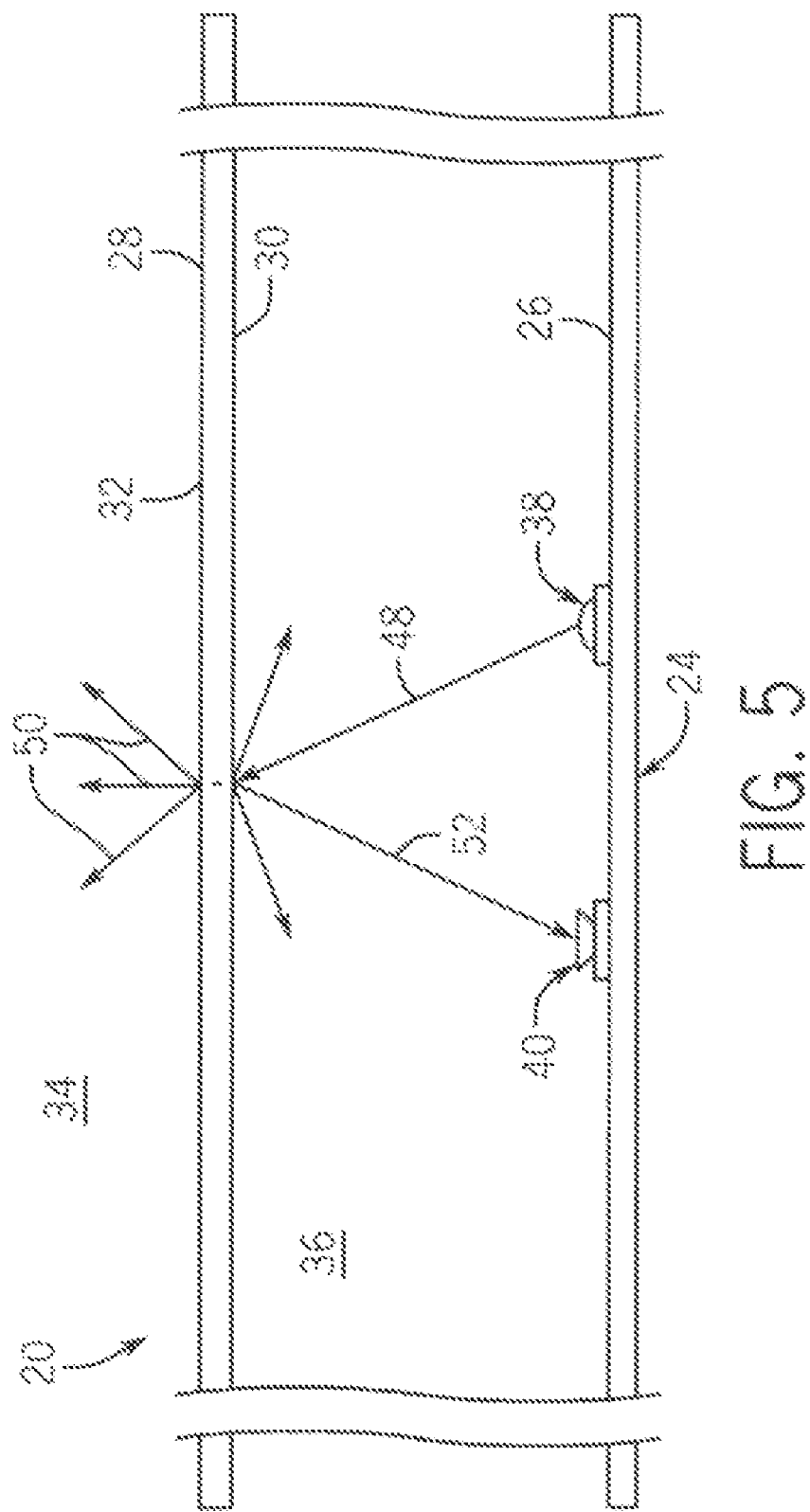
FIG. 5 is a schematic illustration of a physical arrangement of the light production, transmission, reflection, and detection elements of the light fixture illustrated in FIG. 2 and the interaction of the elements when in an environment such that no sources of light external to and not part of the invention are present, but the light emitting elements of the LED light source of the light fixture are energized.
Figure 6:
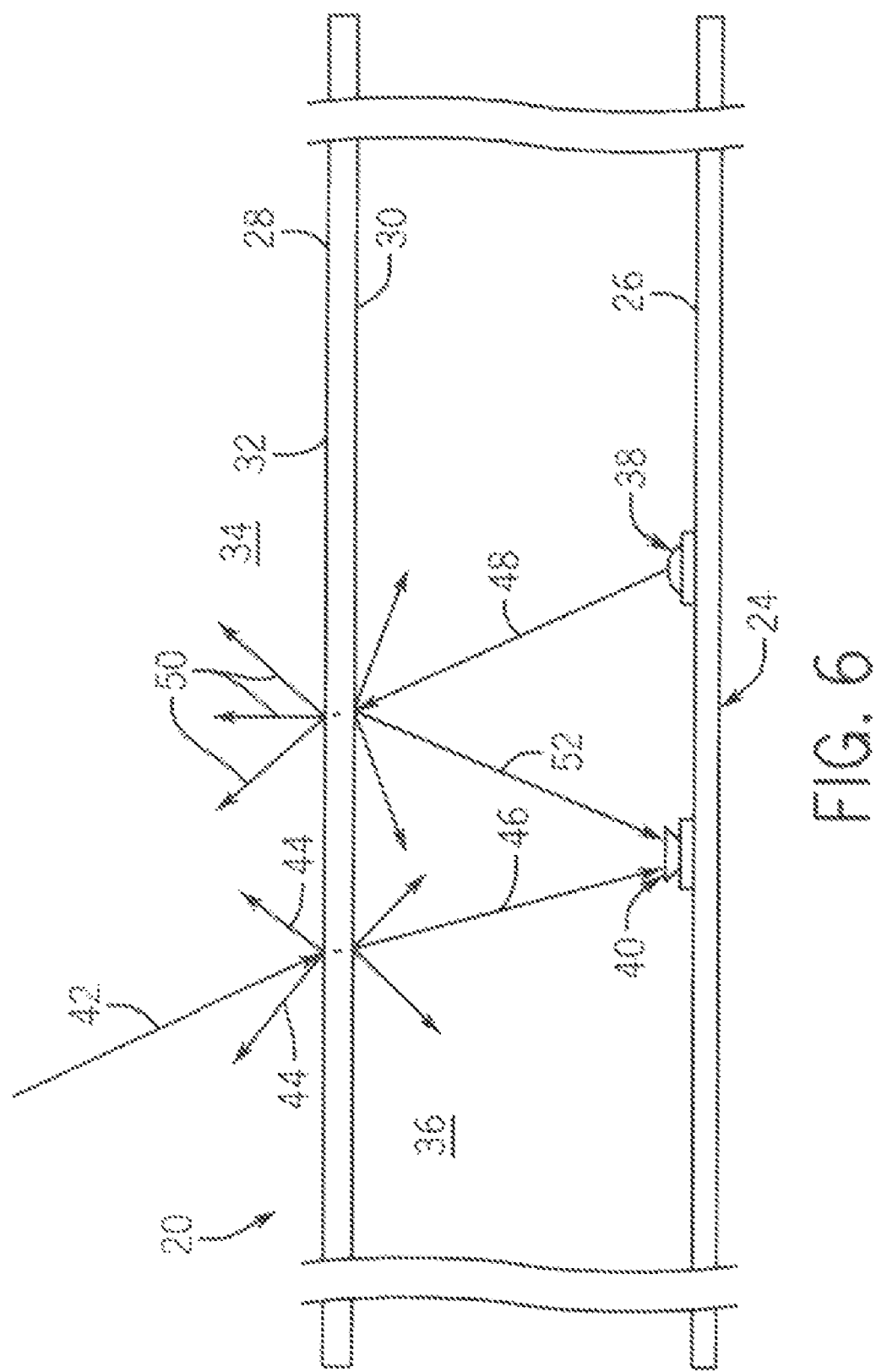
FIG. 6 is a schematic illustration of a physical arrangement of the light production, transmission, reflection, and detection elements of the light fixture illustrated in FIG. 2 and their interaction when in an environment such that one or more sources of light external to and not part of the invention are present, and the light elements of the LED light source of the light fixture are energized.

FIGS. 4, 5, and 6 show generalized exemplary embodiments of three physical modes of operation of the optical arrangement of light fixtures. FIGS. 4 and 6 illustrate conditions that are encountered during normal function of the lighting fixture. FIG. 5 is included to demonstrate the operating conditions that are simulated by operations performed by the monitoring system 18 on measurements taken by the light sensor element when the conditions described in FIGS. 4 and 6 are present.

FIG. 4 illustrates a functional example of the behavior of the optical arrangement of an embodiment of a lighting fixture when an LED lighting fixture 20 is placed in an environment such that one or more sources of external light are present, but the LED light source 38 of the lighting fixture 20 is not energized. Light from any sources external to the LED lighting fixture 42, known as ambient light, strikes the outside of the partially transmissive surface of the transmissive panel. A portion of this light is absorbed by the surface, a portion is reflected 44 off the exterior 32 of the panel 28 surface, and a portion is transmitted and diffused as it passes through the transmissive panel 28 surface and into the interior 36 of the housing of the LED light fixture 20. Additional light from external sources may enter the volume enclosed by the LED light fixture without passing through transmissive panel 28 if the panel does not entirely enclose the LED lighting fixture 20 or other openings in the housing 22. Due to the optically integrating nature of the interior of the LED light fixture 20, the amount of light 46 falling on the light sensor 40 will be proportional to the total amount of ambient light 42 striking the outer surface of the LED light fixture 20 and ambient light 42 entering the LED light fixture 20 without passing through the transmissive surface 30. In this mode of operation, the light sensor 40 generates a signal proportional to the total amount of ambient luminous flux entering the interior 36 of the lighting fixture 20, with the LED light source 38 OFF.

FIG. 5 illustrates a functional exemplary embodiment of the behavior of the optical arrangement when a LED light fixture 20 is placed in an environment such that no sources of light external to and not part of the LED light fixture 20 are present, but only the LED light source 38 within the light fixture is energized. It is contemplated that this mode of operation will not occur during typical normal operation of the LED light fixture 20, since some ambient light 42 will always be present and sourced from outside the LED light fixture 20. The result of a subtraction of the light sensor output generated by the operational state described in FIG. 4 from the light sensor output generated by the operational state described in FIG. 6 is effectively equal to the light sensor output generated by the operational state described in FIG. 5.

As illustrated in FIG. 5, light 48 emitted by the LED light source 38 strikes the transmissive surface 30 of the transmissive panel and a portion of this light is absorbed by the surface, a portion is transmitted 50 through the panel and into the space external to the LED light fixture 34, and a portion of the light 52 is reflected by the transmissive surface of the transmissive panel back into the interior 36 of the LED light fixture. Due to the optically integrating nature of the LED light fixture interior, the amount of light 52 falling on the light sensor in this mode of operation is proportional to the total amount of light emitted by the LED light source 38. In this mode of operation, the light sensor 40 generates a signal proportional to the total amount of luminous flux emitted only by the LED light source.

FIG. 6 illustrates a functional example of the behavior of the optical arrangement of a lighting fixture when a LED light fixture is placed in an environment such that one or more sources of light are external to the light fixture, and the LED light source is energized. Light from sources external 42 to the LED lighting fixture strikes the outside of the transmissive panel. A portion of this light is absorbed by the panel, a portion is reflected 44 off the exterior 32 of the panel, and a portion is diffused 46 as it passes through the panel and into the interior 36 of the LED light fixture. Additional light from external sources may enter the volume enclosed by the housing 22 of the LED lighting fixture without passing through transmissive panel 28 if the transmissive panel 28 does not entirely enclose the LED light fixture 20. Light emitted 48 by the LED light source 38 strikes the transmissive surface 30 of the transmissive panel 28 and a portion of this light is absorbed by the surface, a portion is transmitted through the panel 50 and into the space external to the LED light fixture 34, while a portion of this light is reflected by the transmissive surface 30 of the transmissive panel 28 and back into the interior 36 of the LED light fixture 20. Due to the optically integrating nature of the interior of the LED light fixture, the amount of light falling on the light sensor 40 from external sources 46 is proportional to total of the sum of ambient light 42 striking the outer surface 32 of the LED light fixture 20 and ambient light entering the LED light fixture without striking the outer surface, and the amount of light 48 emitted by the LED light source 38. In this mode of operation, the light sensor 40 generates a signal proportional to the sum of the total amount of ambient luminous flux entering the interior volume 36 of the light fixture 20 and the total amount of luminous flux emitted by the LED light source 38.

Figure 7:
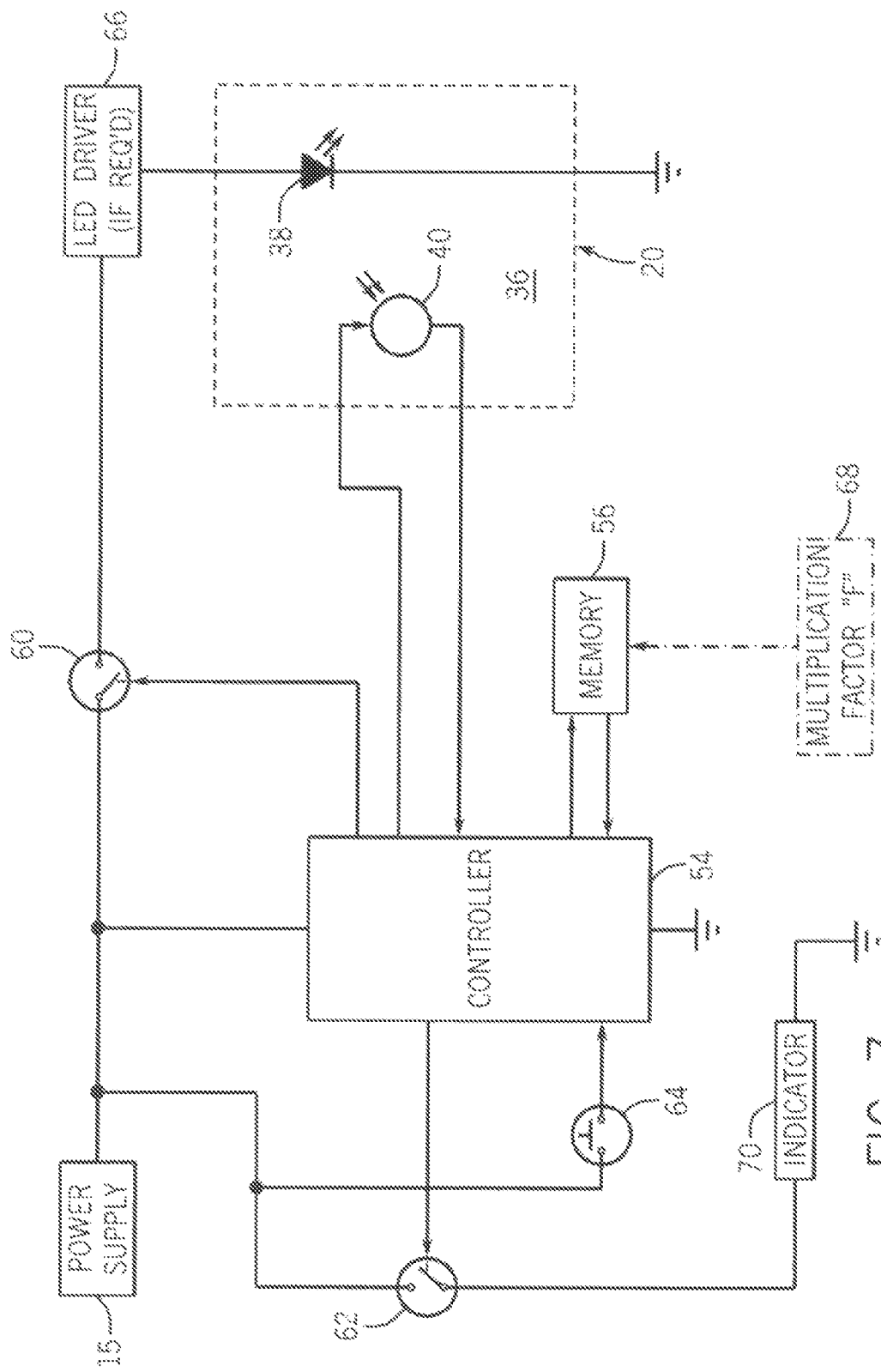
FIG. 7 is a schematic block diagram of the electrical and electronic components of the light fixture illustrated in FIG. 2.

When power from an electric power source 15 to the LED light fixture 20 is energized, power is also applied to a controller 54 and the light sensor 40 that comprises part of the measurement system and is illustrated in FIG. 7. The optical arrangement is initially in a state as shown in FIG. 4, such that the quantity of light falling on the light sensor 40 is proportional to the amount of ambient light 46 entering the interior volume 36 of the LED light fixture 20. The controller 54 then proceeds through the operational procedure(s) illustrated in FIGS. 8, 9, and 10. These procedures are referred to as the program or algorithm of the controller 54, and this program is written to memory 56 during the course of manufacture of a LED light fixture 20. Switches 60 and 62 are normally-open, and only close when an appropriate signal is applied by the controller 54. Switch 64 is normally-open, and only closes when subject to an external signal separate from the normal operation of the lighting fixture (for example by depressing a switch button). Before initial operation of the system, variables used by the system program (REFERENCE, AMBIENT, and TOTAL) are set to default values (typically zero). The operational procedures (or program) in the controller 54 are repeated each time the LED light fixture 20 is changed from a de-energized to an energized state. In other words, each time the lighting fixture 20 is turned ON.

The controller 54 may be a microprocessor or a microcontroller mounted on the same substrate as the LED light source components or in a separate housing mounted in the light fixture 20. The controller 54 may also be a server coupled to an array of peripherals or a desktop computer, or a laptop computer, or a smart-phone. It is also contemplated that the controller is configured to control more than one light fixture 20 and may be remote from any of the light fixtures 20. Communication between the controller 54 and the light fixture 20 may be either by hardwire or wireless devices. The memory/data base may be remote from the controller 54. The controller 54 typically may include an input device, for example a mouse, or a keyboard, and a display device, for example a monitor screen or a smart phone. Such devices can be hardwired to the controller or connected wirelessly with appropriate software, firmware, and hardware. The display device may also include a printer coupled to the controller 54. The display device may be configured to mail or fax reports as determined by a user. The controller 54 may be coupled to a network, for example, a local area network or a wide area network, which can be one of a hardwire network and a wireless network, for example a Bluetooth network or internet network, for example, by a WI-FI connection or "cloud" connection.

Figure 8:
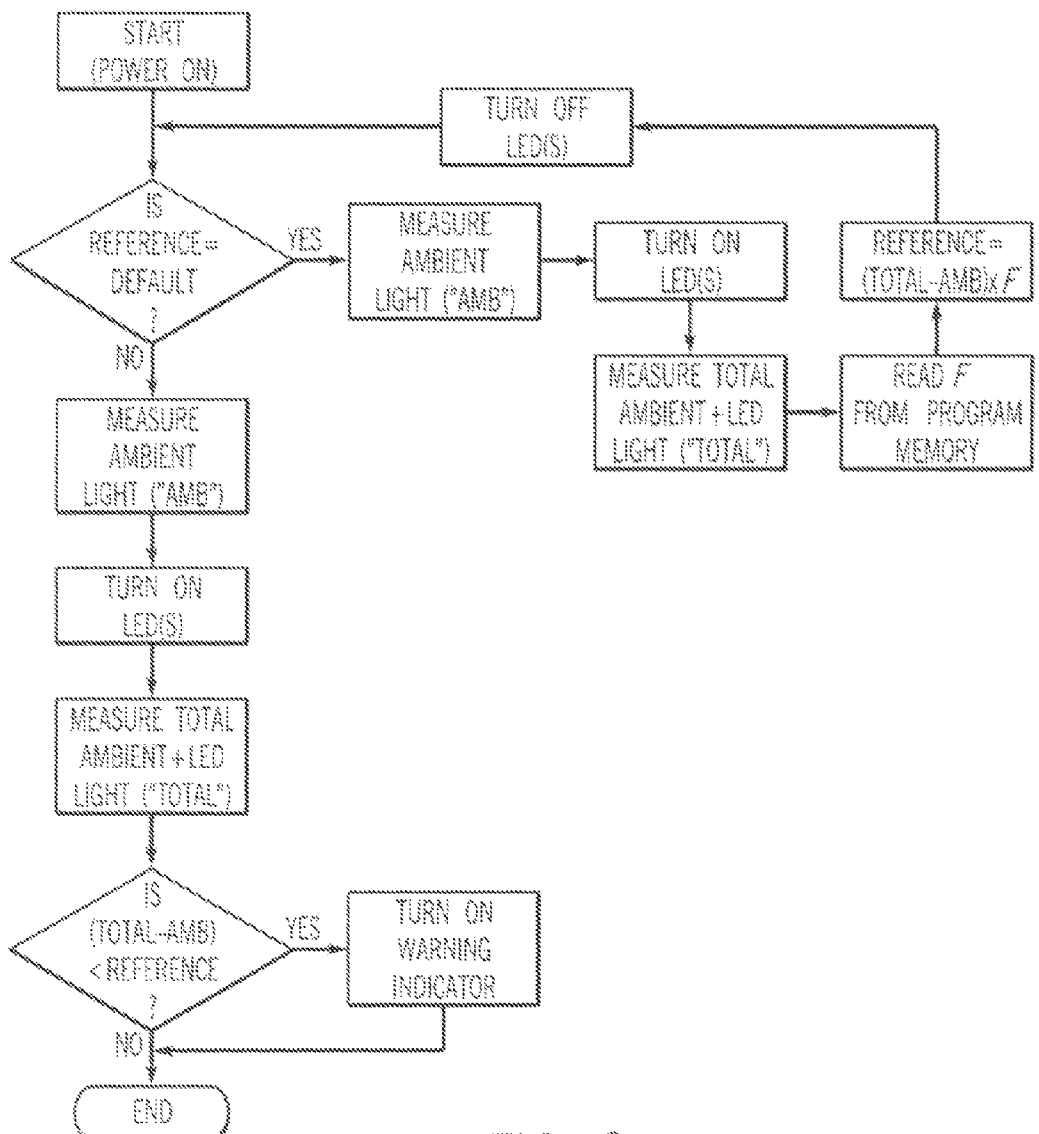
FIG. 8 is a functional block diagram of the behavior of one embodiment of a light fixture, wherein the luminous flux measurement used as the initial condition to which all subsequent measurements are compared is set the first time the lighting fixture is energized.

The control program of the system 18 is described graphically in FIG. 8. Though names are given to the process variables used by the program to control the system, they are provided in this description for reference only and may be replaced with any other variable names in practice.

The start of operation of the system of the invention is when power supply 15 (FIG. 7) is energized, thus creating the opportunity for electrical power to flow to the control and operational elements of the system, thus enabling controller 54 to execute a program stored in memory 56. When power supply 15 is energized, controller 54 reads the value of a variable "REFERENCE" that is stored in memory 56. If the value of REFERENCE is equal to the default value, the controller 54 proceeds to set the reference value used to compare the luminous flux output of the LED light source 38 to its initial value. If the value of REFERENCE is not equal to the default value, the controller 54 proceeds to compare the amount of light 48 produced by the LED light source 38 within the LED lighting fixture 20 to the reference value and energizes the end-of-life indicator 70 if necessary, based on pre-determined conditions stored in the memory 56.

The procedure used to set the reference value is described as follows. Normally open switches 60 and 62 remain off, and thus the quantity of light falling on the light sensor 40 illustrated in FIG. 2 is proportional to the amount of ambient light 42 entering the interior volume 36 of the LED light fixture 20 (as in FIG. 4). The controller 54 receives the output signal value of light sensor 40 and stores, in the memory 56, this value as variable AMBIENT. The controller 54 then turns ON the LED light source 38 in the lighting fixture 20 by transitioning switch 60 from "OFF" to "ON," allowing electrical power to flow into a LED driver 66 and LED light source 38. The optical components of the system 18 are then transitioned to the state as shown in FIG. 6, such that the quantity of light falling on the light sensor 40 is proportional to the sum of the amount of ambient light 42 entering the interior volume 36 of the LED light fixture 20 and the amount of light emitted by the LED light source 38 and reflected within the interior 36 of the lighting fixture 20. The controller 54 then reads the output of light sensor 40 again, and stores, in the memory 56, this value as variable TOTAL. The controller 54 then subtracts the value of AMBIENT from the value of TOTAL and multiplies the result by a depreciation factor F 68 which may be any real number from zero to 1. This calculation may take place at any time during the process.

Depreciation factor F 68 sets the amount of loss of light output at which the controller 54 determines that the lighting fixture 20 or the LED light source 38 has reached the end of its useful life and turns on the notification device 70, for example a warning light, audible sound, or other suitable visual or audible signal, of this condition. For example, if the system 18 is to provide notification when the output of the LED light source 38 has dropped to 70% of its initial output, factor F 68 will be set to 0.7. The value of depreciation factor F 68 typically is written into the memory 56 of the controller 54 during the programming operation performed during manufacture of an LED light fixture 20.

The value obtained by multiplying the difference between the TOTAL value and the AMBIENT value of luminous flux by the depreciation factor F 68 is stored in memory 56 as the value of REFERENCE the first time the lighting fixture 20 is energized after being put into service. The controller 54 then causes switch 60 to open, disconnecting power from the LED driver 66 and LED light source 38, and the system 18 repeats the initial step, described above, of reading the value of REFERENCE.

If the value of REFERENCE is not equal to the default value upon application of power to the system 18, switches 60 and 62 remain off and the output of light sensor 40 is proportional to the amount of ambient light 42 entering the interior volume 36 of the LED light fixture 20 (as in FIG. 4). Controller 54 reads the output of light sensor 40 and stores, in memory 56, the value as variable AMBIENT. The controller 54 then energizes the LED light source by transitioning switch 60 from "OFF" to "ON," allowing electrical power to flow into the LED driver 66 and LED light source 38. The optical components of the LED light fixture 20 then transition to the state described in FIG. 6, such that the quantity of light falling on the light sensor 40 is proportional to the sum of the ambient light 42 entering the interior volume 36 of the LED lighting fixture 20 and the amount of light 48 emitted by the LED light source 38 and reflected within the interior 36 of the LED lighting fixture 20. The controller 54 then reads the output of light sensor 40 and stores, in the memory 56, the value as variable TOTAL. The controller 54 then compares the value of (TOTAL-AMBIENT) to the value of REFERENCE stored in memory 56. If (TOTAL-AMBIENT) is greater than REFERENCE, the controller 54 takes no action, leaving switch 60 in the "ON" state and switch 62 in the "OFF" (initial) state. If (TOTAL-AMBIENT) is less than REFERENCE, the controller transitions switch 62 to "on," energizing an external notification device also referred to as an end-of-life indicator 70 that the amount of light 48 generated by the LED light source 38 has fallen below the ratio (or "lumen depreciation factor") pre-determined by multiplier F 68. The controller 54 then maintains the operational state of switches 60 and 62 until power 15 to the LED light fixture 20 is turned off.

In another embodiment, the control program illustrated in FIG. 8 is modified to allow the stored comparison value REFERENCE to be re-set the next time the LED light fixture 20 is de-energized and re-energized (also known as "cycling power" to the lighting fixture). In this embodiment (see FIG. 9), after the controller 54 reaches the decision state comparing the current light output of the LED light source 38 (TOTAL-AMBIENT) to the reference value (REFERENCE) and generates an external notification if necessary, the controller 54 reads the value of an external input "RESET" 64 and determines whether this input has been activated (or "true"). If the value of RESET is "true," the controller 54 sets the value of REFERENCE to the default value, and then maintains the current state of the system 18 until power is cycled. The next time the LED light fixture 20 is energized, the controller 54 repeats the process of setting the initial comparison value REFERENCE and repeats the process of measuring the output of the LED light source 38, comparing it to REFERENCE, and energizing the external notification 70 device if necessary. If the value of RESET is "false," the controller 54 repeats a cycle of reading the value of RESET and determining its state until RESET returns a value of "true". This embodiment is illustrated in FIG. 10.

Figure 9:
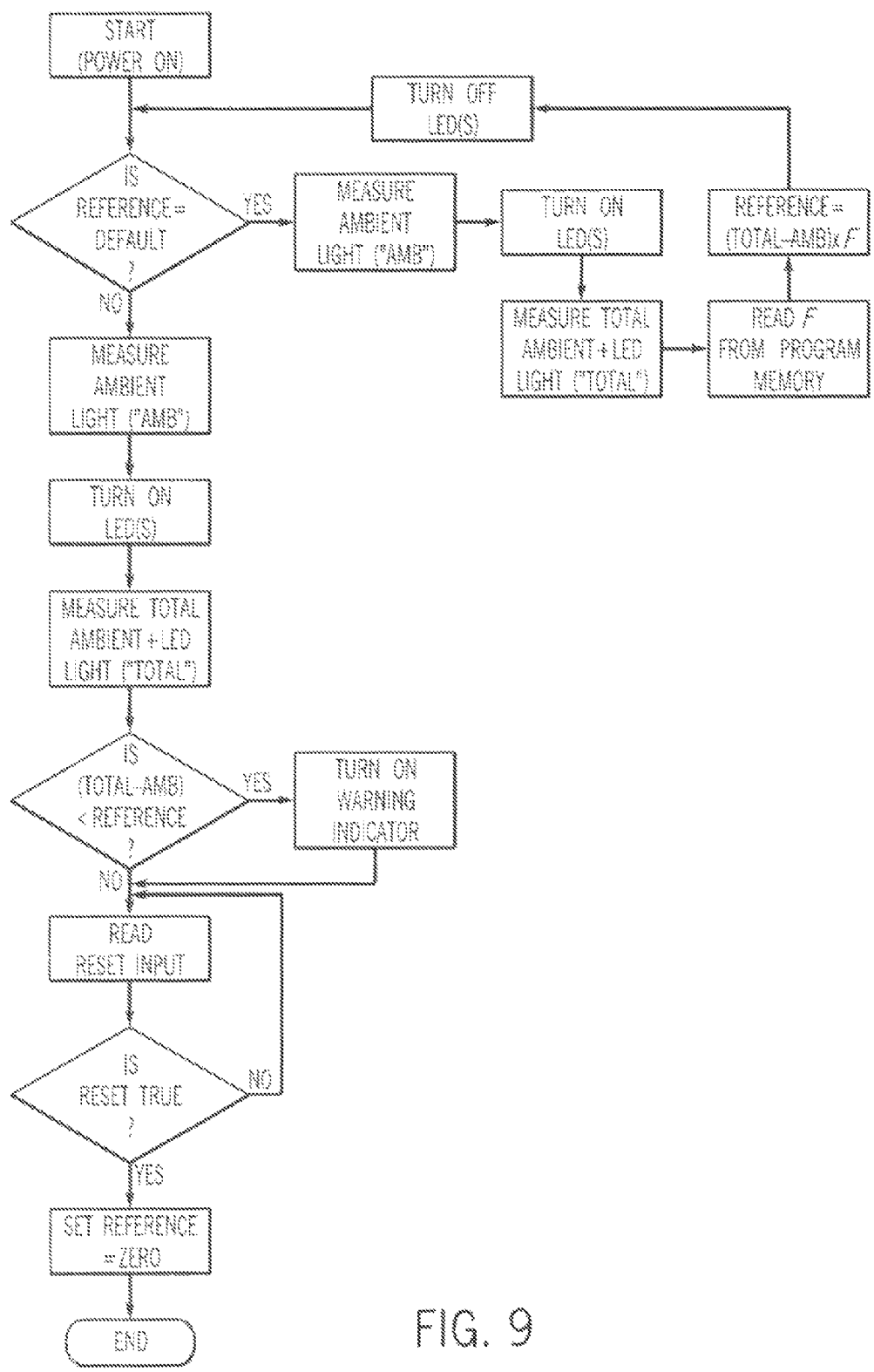
FIG. 9 is a functional block diagram of the behavior of one embodiment of a light fixture, wherein the luminous flux measurement used as the initial condition to which all subsequent measurements are compared is set the first time the lighting fixture is energized, and also allows for the initial condition to be re-set by the user at the time of the next transition of the light fixture from a non-energized state to an energized state.
Figure 10:
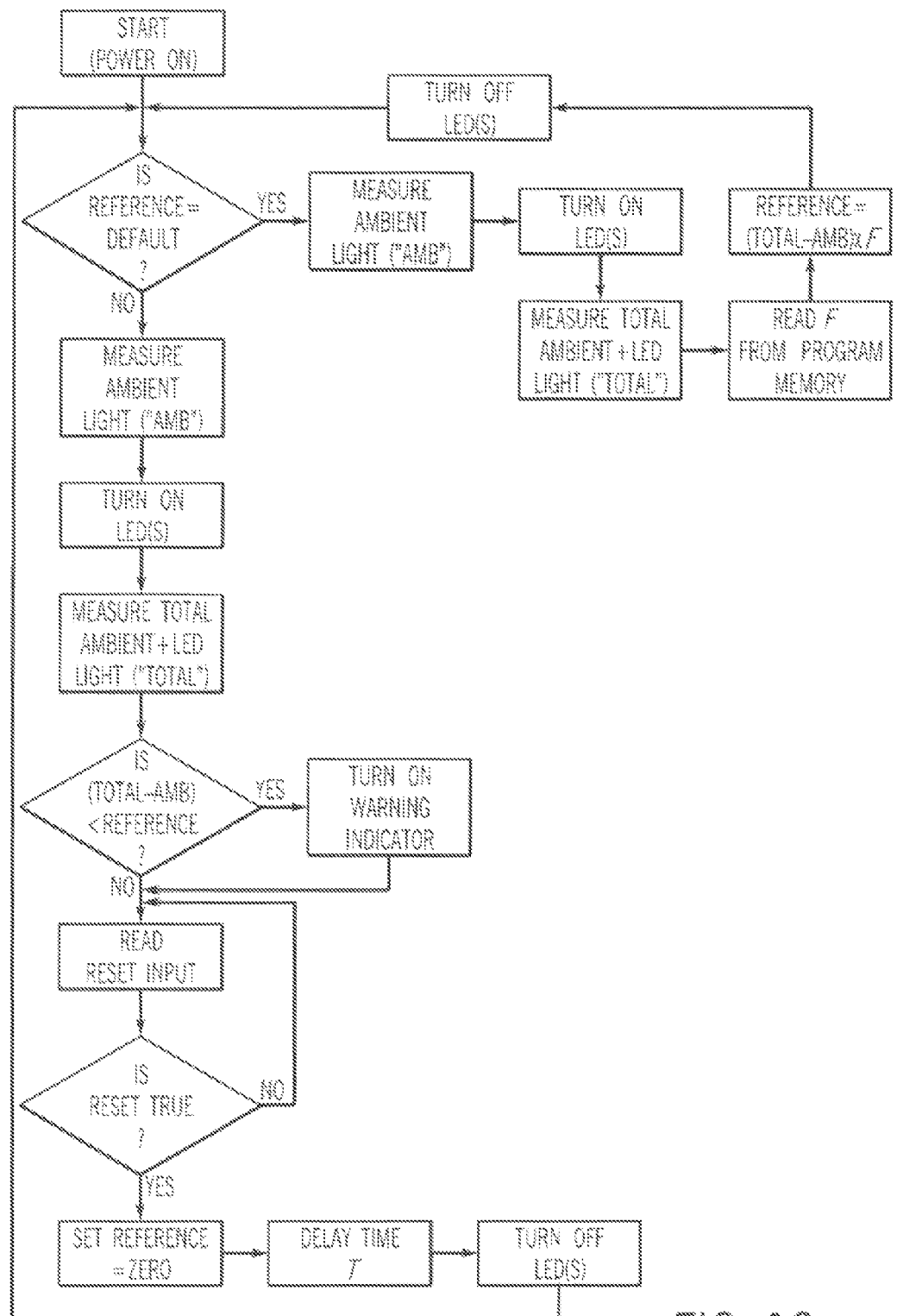
FIG. 10 is a functional block diagram of the behavior of one embodiment of a light fixture, wherein the luminous flux measurement used as the initial condition to which all subsequent measurements are compared is set the first time the lighting fixture is energized and also allows for the initial condition to be re-set by the user without a requirement to de-energize and re-energize the light fixture.

In another embodiment of the light fixture 20, the control program illustrated in FIG. 9 is modified to allow the stored comparison value REFERENCE to be re-set after a predetermined delay time, without requiring power to the LED light fixture 20 to be cycled. (See FIG. 10) In this embodiment, if the value of the RESET input is "true," the controller 54 sets the value of REFERENCE to the default value, waits a predetermined delay time T, then turns off switch 60 and switch 62 (if on) thereby de-energizing the LED light source 38 and the external notification device 70. The controller 54 then repeats the process of setting the initial comparison value REFERENCE and repeats the process of measuring the output of the LED light source 38, comparing it to REFERENCE, and turning on the switch 62 energizing the external indication 70 if necessary. This embodiment is illustrated in FIG. 10.

In all embodiments, the process of comparing the instantaneous output of the LED light source 38 inside a LED light fixture 20 to a reference value is repeated each time the LED light fixture 20 is energized. Conducting this comparison at the time of initial start-up of a LED light fixture 20 allows the system 18 to cancel out the effects of ambient light entering the optical system of the LED light fixture 20 when measurements are taken, and may be conducted over a short period of time so as to eliminate thermal effects on the amount of luminous flux generated by the LED light source and so not as to be noticed by users of the LED light fixture 20.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present disclosure has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations as described herein may be made, none of which depart from the spirit or scope of the present disclosure. The particular embodiments and applications were chosen and described to provide the best illustration of the principles of the disclosure and its practical application to thereby enable one of ordinary skill in the art to utilize the various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:

1. A luminous flux monitoring system for a light fixture, the light fixture, coupled to an electric power source, comprising a housing defining an interior space including an interior surface and a transmissive panel disposed a spaced-distance from the interior surface, with the housing including a light source coupled to the interior surface, the system comprising:

a light sensor coupled to the interior surface a spaced distance from the light source and aligned to receive light from at least the transmissive panel, the light sensor configured to measure luminous flux in the interior space; and a controller coupled to the electric power source, the light source, and the light sensor, wherein the controller is configured to determine if a light sensor measurement of luminous flux in the interior space is more or less than a reference value of luminous flux, wherein the reference value of luminous flux is a value comprising a difference between a total luminous flux measurement in the interior space from ambient light and light from the light source and an ambient luminous flux measurement in the interior space with the light source off, with the difference multiplied by a depreciation factor, and wherein if the measurement of luminous flux is less than the reference value, the controller is configured to activate an end-of-life indicator.

2. The luminous flux monitoring system for a light fixture of claim 1, wherein the measurement of luminous flux include luminous flux directly emitted from the light source, emitted from the light source and reflected from the transmissive panel, emitted from the light source and reflected from the interior surface, ambient luminous flux passing through the transmissive panel, and ambient luminous flux entering the light fixture without passing through the transmissive panel.

3. The luminous flux monitoring system for a light fixture of claim 1, wherein the depreciation factor is a real number from zero to 1.

4. The luminous flux monitoring system for a light fixture of claim 3, wherein the depreciation factor is 0.70.

5. The luminous flux monitoring system for a light fixture of claim 1, wherein the light source is a LED.

6. The luminous flux monitoring system for a light fixture of claim 1, wherein the controller is mounted in the interior space.

7. A method for monitoring luminous flux depreciation in a light fixture, the light fixture, coupled to an electric power source, comprising a housing defining an interior space including an interior surface and a transmissive panel disposed a spaced-distance from the interior surface, with the housing including a light source coupled to the interior surface, the method comprising:

coupling a light sensor to the interior surface a spaced distance from the light source;

aligning the light sensor to receive light from at least the transmissive panel, the light sensor configured to measure luminous flux in the interior space;

coupling a controller to the electric power source, the light source, and the light sensor;

determining the reference value of luminous flux by subtracting an ambient luminous flux measurement taken in the interior space with the light source off from a total luminous flux measurement in the interior space of ambient light and light from the light source, and multiplying the difference by a depreciation factor; and determining in the controller if a light sensor measurement of luminous flux in the interior space is more or less than a reference value of luminous flux, wherein if the measurement of luminous flux is less than the reference value, the controller is configured to activate an end-of-life indicator.

8. The method for monitoring luminous flux depreciation in a light fixture of claim 7, wherein the depreciation factor is a real number from zero to 1.

9. The method for monitoring luminous flux depreciation in a light fixture of claim 8, wherein the depreciation factor is 0.70.

10. The method for monitoring luminous flux depreciation in a light fixture of claim 7, wherein the measurement of luminous flux include the step of measuring luminous flux directly emitted from the light source, emitted from the light source and reflected from the transmissive panel, emitted from the light source and reflected from the interior surface, and ambient luminous flux passing through the transmissive panel, and ambient luminous flux directly entering the interior of the light fixture.

11. The method for monitoring luminous flux depreciation in a light fixture of claim 7, wherein the light source is a LED.

12. The method for monitoring luminous flux depreciation in a light fixture of claim 7, wherein the controller is mounted in the interior space.

13. A LED light fixture coupled to an electric power source comprising:

a housing defining an interior space including an interior surface and a transmissive panel disposed a spaced-distance from the interior surface;

a LED light source coupled to the interior surface;

a light sensor coupled to the interior surface a spaced distance from the LED light source and aligned to receive light from at least the transmissive panel, the light sensor configured to measure luminous flux in the interior space; and a controller coupled to the electric power source, the LED light source, and the light sensor, wherein the controller is configured to determine if a light sensor measurement of luminous flux in the interior space is more or less than a reference value of luminous flux, wherein the reference value of luminous flux is a value comprising a difference between a total luminous flux measurement in the interior space from ambient light and light from the LED light source and an ambient luminous flux measurement in the interior space with the LED light source off, with the difference multiplied by a depreciation factor, and wherein if the measurement of luminous flux is less than the reference value, the controller is configured to activate an end-of-life indicator.

14. The LED light fixture of claim 13, wherein the measurement of luminous flux include luminous flux from the LED light source reflected from the transmissive panel, directly emitted from the light source, and reflected from the interior surface, and ambient luminous flux passing through the transmissive panel and entering the light fixture interior without passing through the transmissive panel.

15. The LED light fixture of claim 13, wherein the depreciation factor is a real number from zero to 1.

16. The LED light fixture of claim 15, wherein the depreciation factor is 0.70.

17. The LED light fixture of claim 13, wherein the controller is mounted in the interior space.

* * * * *

UNITED STATES PATENT AND TRADEMARK OFFICE
CERTIFICATE OF CORRECTION

Page 1 of 2

PATENT NO. : 8,111,388 B2
APPLICATION NO. : 12/850068
DATED : February 7, 2012
INVENTOR(S) : Christopher M. Glandt, Jay M. Eissner and Mark J. Hastings It is certified that error appears in the above-identified patent and that said Letters Patent is hereby corrected as shown below:

In the title page:
(75) Inventors:
"Jay M. Eissner, Sheboygal, WI (US)" should read --Jay M. Eissner, Sheboygan, WI (US)--.

In the specification:
Column 5, line 40
"36 of the light fixture 20. In one embodiment the light sensor" should read --36 of the light fixture 20. In one embodiment the light sensor 40--.

Column 5, line 54
"interior surface are positioned within the viewing angle α of" should read --interior surface 26 are positioned within the viewing angle α of--.

Column 5, line 57
"by the LED lighting fixture 20 surface and the transmissive" should read --by the LED lighting fixture 20 surface 26 and the transmissive--.

Column 7, line 10
"ing 22 of the LED lighting fixture without passing through" should read --ing 22 of the LED lighting fixture 20 without passing through--.

Column 7, line 65
"memory/data base may be remote from the controller 54. The" should read --memory/data base 56 may be remote from the controller 54. The--.

Column 9, line 20
"54 then energizes the LED light source by transitioning" should read --54 then energizes the LED light source 38 by transitioning--.

Signed and Sealed this
Twenty-fourth Day of July, 2012

David J. Kappos
*Director of the United States Patent and Trademark Office*

Column 10, line 22
"system 18 to cancel out the effects of ambient light entering" should read --system 18 to cancel out the effects of ambient light 42 entering--.